Jan. 20, 1931.   R. E. POWELL   1,789,475
SOLDERING IRON HOLDER
Filed Oct. 29, 1925

Inventor
Raymond E. Powell
by [signature]
Att'y.

Patented Jan. 20, 1931

1,789,475

UNITED STATES PATENT OFFICE

RAYMOND EUGENE POWELL, OF MAYWOOD, ILLINOIS, ASSIGNOR TO WESTERN ELECTRIC COMPANY, INCORPORATED, OF NEW YORK, N. Y., A CORPORATION OF NEW YORK

SOLDERING IRON HOLDER

Application filed October 29, 1925. Serial No. 65,547.

This invention relates to soldering iron holders, and has for its main object the provision of a holder for soldering irons which will support the iron when not in use and conduct away sufficient heat to prevent injury to an electric heating element thereof through over-heating.

In accordance with an embodiment, the invention contemplates the provision of a soldering iron holder comprising a segmental jacket having radiating fins formed thereon, the jacket being designed to permit insertion of a soldering iron and responsive to the weight of the iron, when inserted, to grip a portion of the iron.

The invention will be more readily understood from a consideration of the following description taken with the accompanying drawings, in which Fig. 1 is a view, in perspective, of a holder embodying the features of the present invention showing an electrically heated soldering iron about to be inserted therein;

Figure 1:
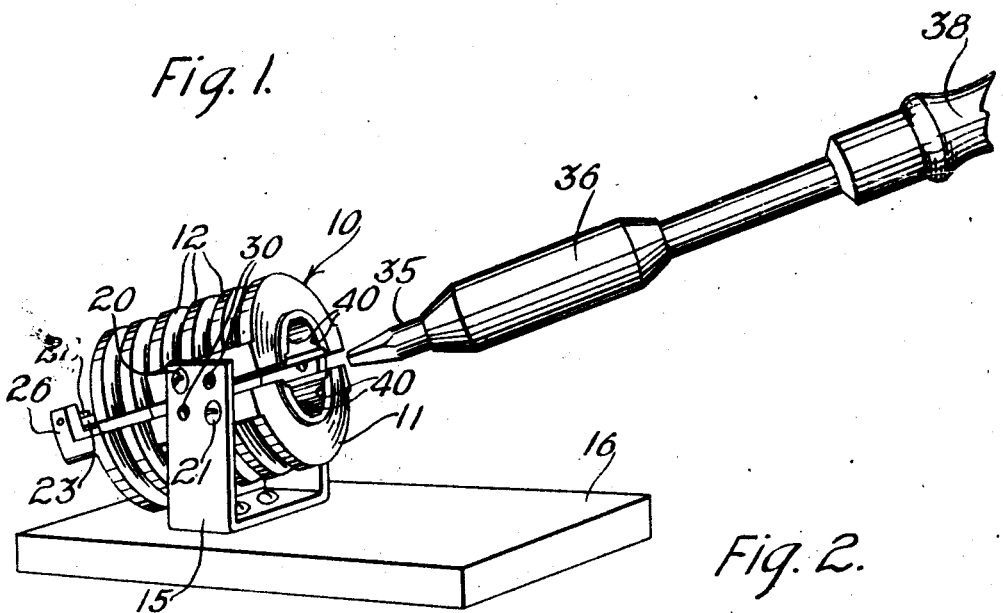

Referring now in detail to the drawings, a holder embodying the main features of the invention may comprise an upper and lower holding member designated by the numerals 10 and 11, respectively, and having heat radiating fins 12—12 formed integrally therewith. The members 10 and 11 are pivotally secured to the upright portions of a bifurcated mounting member 15 which is suitably secured to a base 16. The pivots for the members 10 and 11 are trunnion-like, being two in number for each member and are designated by the numerals 20—20 and 21—21, respectively. The pivots 20 and 21 are diagonal to the front face of the holder and are located forward of the center of gravity of their respective members. This construction results in the two members assuming a tilted position when not holding an object and also being farther separated from each other when tilted than when they are in a horizontal position.

Figure 2:
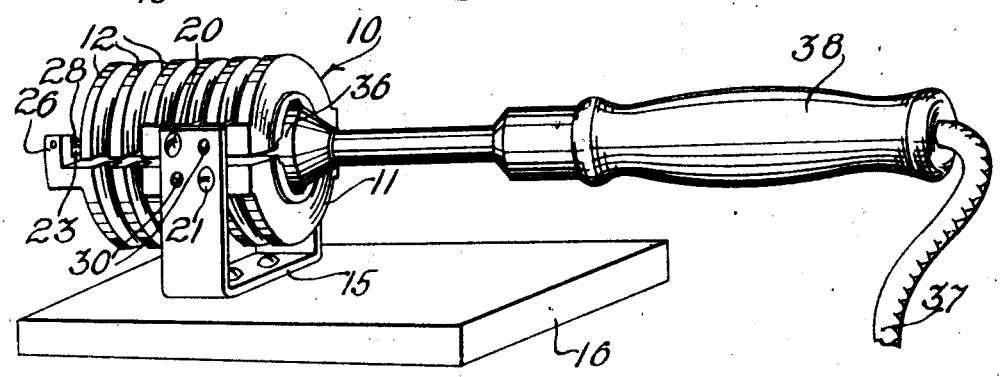
Fig. 2 is a similar view showing the holder with the iron inserted therein.

As shown more clearly in Figs. 1 and 2 the pivots 20 and 21 are positioned to the right of the vertical center line of the members 10 and 11 as viewed in these figures, and consequently the left-hand portion thereof is of a greater weight than the right-hand portion so that when the soldering iron 36 is removed the natural tendency of the members 10 and 11 is to assume a tilted position. Also, the pivots 20 and 21 are arranged on a diagonal so that when the members 10 and 11 are in a tilted position the spacing therebetween will be of a greater distance than when they are in their horizontal position. In this connection it is noted that when the members 10 and 11 are in a horizontal position, as viewed in Fig. 2, the spacing between them is a predetermined amount, but by having the pivots 20 and 21 arranged on a diagonal the member 10 will move through an arc greater than will the member 11 resulting in a greater separation of the members when they are in the tilted position as viewed in Fig. 1.

Figure 3:
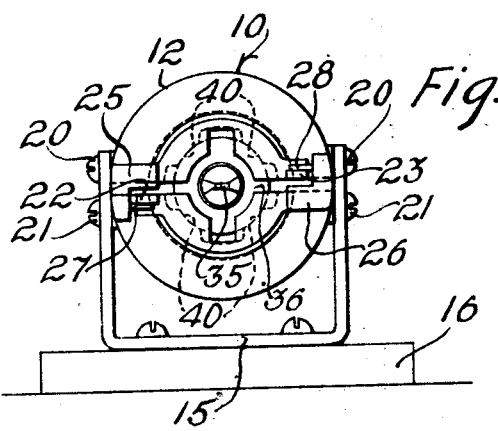
Fig. 3 is an end elevational view of the holder showing a soldering iron inserted therein.

The holding members 10 and 11 are provided with extensions designated by the numerals 23 and 22, respectively, and lugs 25 and 26 in which are inserted stop pins 27 and 28, respectively. As shown particularly in Fig. 3, the extension (22 or 23) on one holding member is positioned between the stop pin (27 or 28) and a shoulder integral with the lug (25 or 26) on the other holding member. The bearing of the extension on the shoulder prevents the holding members from coming so close together at the rear end thereof as to make the insertion of a soldering iron difficult; and the stop pins engage the extensions when the iron is inserted to prevent too great a separation of the rear portions of the holding members, which separation might permit the end of the iron to extend too far therethrough. The tilting of the members when an object is not being held thereby is limited by one of the lugs (25 or 26) engaging the end portion of the oppositely disposed holding member.

In the drawings the holder is shown mounted in an upright position but it is obvious that it might be desirable to mount it in an inverted position, as for instance, under a work bench. To accomplish this a second set of pivot holes 30—30 is provided in the mounting member 15 and corresponding holes formed in each side of the members 10 and 11. Suitable pivots such as pins or screws can then be secured in the holes, and the screws in the pivots 20 and 21 removed. The members 10 and 11 will then be opened when tilted in the opposite direction than when mounted as shown in the drawings, and are then adapted to be mounted in an inverted position.

The holder is designed for use with any usual type of electrically heated soldering iron such as shown in the accompanying drawings in which a tip 35 is heated by a heating element (not shown) contained within a tubular portion 36, current being supplied from a suitable source (not shown) through a cord 37 which is led through the customary wooden handle 38. The greater portion of the heat in the iron is confined to the tip 35 and the portion 36 containing the heating element, and as shown in Fig. 2 the weight of the iron moves the members 10 and 11 from a tilted to a substantially horizontal position whereby the portion 36 is securely gripped by these members. The holder may be designed to grip the tip 35 also, but the heat conducted therefrom is small in comparison to that from the portion 36, and inasmuch as many different shapes and sizes of tips are employed, and each one would require a different holder, it is preferable to design the holder to engage only the portion containing the heating elements. With this design the holder may be employed with soldering irons having any style of tip.

The members 10 and 11 may be constructed of any material which is heat conducting, but preferably a material which will conduct the heat away from the soldering iron more rapidly than ordinary iron or iron alloys. A very good metal for this use is aluminum as it is such a good conductor of heat that the radiating surface supplied by the fins 12 need not be excessively large. The interior portion of the holder may be provided with longitudinal corrugations 40 which limit the amount of surface in contact with the iron. This limits the conduction of heat and prevents too rapid cooling of the iron when first placed in the holder.

A holder embodying the features of the present invention is of particular utility when used with so-called "heavy duty" soldering irons for soldering operations, which necessarily require a great amount of heat, and which when not in use have a tendency to become so hot as to destroy the heating element and otherwise damage the iron if allowed to remain unused for any length of time without disconnecting it from the source of current. A holder embodying the features of this invention renders unnecessary the turning off or limiting the current to the iron by external resistors or other devices to avoid overheating thereof when not in use. Thus the iron is always ready for immediate use since it is not necessary to await the appreciable amount of time required after the application of electric current to the heating element for the transformation of that current into heat by the heating element and the flow of the heat produced thereby to the soldering tip.

What is claimed is:

1. A soldering iron holder having heat radiating elements formed thereon and designed to receive heat from said iron at a rate having a predetermined ratio to the rate at which heat is generated in said iron so as to approximate actual working conditions to respond to the weight of the iron when inserted therein to grip a portion of the iron.

2. A soldering iron holder comprising a plurality of heat radiating members cooperating to form a jacket encircling the iron, designed to receive heat from said iron at a rate having a predetermined ratio to the rate at which heat is generated in said iron so as to approximate actual working conditions to be partially dissociated from each other to permit insertion of the iron, and responding to the weight of the iron when inserted therebetween, to be brought closer together to grip a portion of the iron.

3. A soldering iron holder comprising a pair of finned members cooperating to form a jacket for the heated portion of the iron, and pivots for the finned members positioned diagonally with respect to the front faces of the members and forward of the center of gravity of the members.

4. A soldering iron holder comprising a pair of finned members cooperating to form a jacket for the heated portion of the iron, pivots for the finned members positioned diagonally with respect to the front faces of the members and forward of the center of gravity of the members to cause the front end of the members to normally tilt upwardly but designed so that the weight of the iron causes the members to assume a substantially horizontal position and grip a portion of the iron, and means for limiting the tilting of the finned members.

5. A soldering iron holder comprising a pair of finned members cooperating to form a jacket for the heated portion of the iron, pivots for the finned members positioned diagonally with respect to the front faces of the members and forward of the center of gravity of the members to cause the front end of the members to normally tilt upwardly but designed so that the weight of the iron causes the members to assume a substantially horizontal position and grip a portion of the iron, and means for spacing the end portion of the two finned members when tilted.

6. A holder for a soldering iron comprising a plurality of relatively movable heat radiating members, and means effective only when the iron is inserted for causing said members to engage the soldering iron when inserted in the holder.

7. A holder for a soldering iron comprising means for holding a soldering iron, and means contacting with the iron at a plurality of spaced points around its periphery for preventing the soldering iron from overheating while in the holder.

8. In a holder for soldering irons, an enclosing element, and longitudinally extending members arranged on the interior surface of the enclosing element firmly gripping a portion of the iron.

9. In a holder for soldering irons, an enclosing element designed to receive the iron provided with interior and exterior corrugations to prevent the soldering iron from overheating while in the holder.

10. In a holder for soldering irons, a cylindrical enclosing element designed to receive the iron provided with circularly arranged corrugations on the exterior surface, and longitudinally extending, interior corrugations to prevent the soldering iron from overheating while in the holder.

11. A holder for a soldering iron comprising a plurality of heat radiating members having a normal predetermined separation, and means for causing said members to separate further when in a tilted position to receive a soldering iron.

In witness whereof, I hereunto subscribe my name this thirteenth day of October, A. D. 1925.

RAYMOND EUGENE POWELL.